US007926064B2

(12) United States Patent
Fernandez et al.

(10) Patent No.: US 7,926,064 B2
(45) Date of Patent: Apr. 12, 2011

(54) BUSINESS TRANSFORMATION LOGIC ENGINE AND HANDLERS

(75) Inventors: Jesus Fernandez, North Haven, CT (US); Catherine Elizabeth Sullivan, Central Islip, NY (US); Kejian Qiu, Cheshire, CT (US); Ronald Jacobson, Meriden, CT (US)

(73) Assignee: Computer Associates Think, Inc., Islandia, NY (US)

( * ) Notice: Subject to any disclaimer, the term of this patent is extended or adjusted under 35 U.S.C. 154(b) by 1706 days.

(21) Appl. No.: 10/888,196

(22) Filed: Jul. 9, 2004

(65) Prior Publication Data

US 2005/0171980 A1     Aug. 4, 2005

Related U.S. Application Data

(60) Provisional application No. 60/486,512, filed on Jul. 11, 2003, provisional application No. 60/486,517, filed on Jul. 11, 2003, provisional application No. 60/486,508, filed on Jul. 11, 2003.

(51) Int. Cl.
  *G06F 9/44* (2006.01)
  *G06F 17/00* (2006.01)
(52) U.S. Cl. ........................................ 719/313; 715/239
(58) Field of Classification Search .................. 719/313; 715/239

See application file for complete search history.

(56) References Cited

U.S. PATENT DOCUMENTS

| 6,282,537 | B1 | 8/2001 | Madnick et al. | 707/4 |
| 6,308,178 | B1 * | 10/2001 | Chang et al. | 707/100 |
| 6,415,298 | B1 | 7/2002 | Oesterer et al. | 707/203 |
| 6,694,310 | B1 | 2/2004 | Yu et al. | 707/4 |
| 6,792,431 | B2 * | 9/2004 | Tamboli et al. | 707/102 |
| 6,823,495 | B1 | 11/2004 | Vedula et al. | 715/805 |
| 6,970,869 | B1 * | 11/2005 | Slaughter et al. | 707/10 |
| 7,080,381 | B2 * | 7/2006 | Hannigan et al. | 719/313 |
| 7,506,244 | B1 * | 3/2009 | Qin et al. | 715/229 |
| 2001/0056504 | A1 | 12/2001 | Kuznetsov | 709/310 |

(Continued)

FOREIGN PATENT DOCUMENTS

WO   WO 03/056449 A2   7/2003

OTHER PUBLICATIONS

Notification of Transmittal of the International Search Report and the Written Opinion of the International Searching Authority, or the Declaration for PCT/US2004/022152 mailed Dec. 21, 2004, filed Sep. 7, 2004.

(Continued)

*Primary Examiner* — Van H Nguyen
(74) *Attorney, Agent, or Firm* — Baker Botts L.L.P.

(57) ABSTRACT

A business transformation logic engine for integrating data from a source application to a target application and method thereof are provided. The business transformation logic engine includes a receiving module for receiving data from the source application in a first predetermined format; and at least one transformation handler for transforming the received data into a second predetermined format usable by the target application. The method includes the steps of receiving an XML message including the source data; creating a message context object from the XML message; transforming the message context object using user-configured XSL entries; applying business rules to the transformed message context object; mapping source data elements of the transformed message context object to target data elements; and transforming the XSL-transformed data into a workflow request for integrating the source data to the target application.

6 Claims, 5 Drawing Sheets

U.S. PATENT DOCUMENTS

| | | | | |
|---|---|---|---|---|
| 2002/0019797 | A1 | 2/2002 | Stewart et al. | 705/37 |
| 2002/0046301 | A1* | 4/2002 | Shannon et al. | 719/328 |
| 2002/0069081 | A1* | 6/2002 | Ingram et al. | 705/1 |
| 2002/0083213 | A1* | 6/2002 | Oberstein et al. | 709/313 |
| 2002/0161615 | A1* | 10/2002 | Yui et al. | 705/7 |
| 2002/0184213 | A1 | 12/2002 | Lau et al. | 707/6 |
| 2002/0188761 | A1* | 12/2002 | Chikirivao et al. | 709/250 |
| 2003/0093471 | A1 | 5/2003 | Upton | 709/203 |
| 2003/0101284 | A1* | 5/2003 | Cabrera et al. | 709/313 |
| 2003/0110085 | A1 | 6/2003 | Murren et al. | 705/26 |
| 2003/0130866 | A1* | 7/2003 | Turner et al. | 705/2 |
| 2003/0149934 | A1 | 8/2003 | Worden | 715/513 |
| 2003/0217053 | A1* | 11/2003 | Bachman et al. | 707/4 |
| 2003/0217125 | A1* | 11/2003 | Brancati et al. | 709/220 |
| 2004/0060004 | A1 | 3/2004 | Mani et al. | 715/513 |
| 2004/0083214 | A1 | 4/2004 | Hsieh et al. | 707/6 |
| 2006/0041660 | A1 | 2/2006 | Bishop et al. | 709/224 |

OTHER PUBLICATIONS

Novell, Inc.—*DirXML 1.1 Administrative Guide*—XP-002309371; Provo, Utah; pp. 1-90, Jan. 2002.

Novell, Inc.—*DirXML Aministration Guide Cont'd*—XP-2309371A-1; Provo, Utah; pp. 91-180, Jan. 2002.

Novell, Inc.—*Implementing the DirXML Driver for Lotus Notes*—XP-2309371A-1; pp. 181-224, Jan. 2002.

Novell, Inc.—*Introduction to DirXML*—XP-002309373; pp. 1-90.

Novell AppNotes.—*DirXML Lab 1*—XP-2309373A-1; pp. 91-116, Jun. 14, 2002.

Novell, Inc.—*DirXML 1.0—Removing the Boundaries for E-Business Administration Guide*—XP-002309370—pp. 1-90, Nov. 2000.

Novell, Inc.—*Configuring DirXML Drivers*—XP-2309370A-1; pp. 90-103.

Communication Pursuant to Article 96(2) EPC from the European Patent Office regarding Application No. 04 756 782.1-1527; Ref. HCD/JOO048490EP, Aug. 28, 2006.

Communication Pursuant to Article 96(2) EPC from the European Patent Office regarding Application No. 04 777 927.7-1225; Ref. HCD/JOO048508EP, Aug. 28, 2006.

Dave Musicant and Mihaela Patricia Dabu, "*Efficient Storage of Temporal Data in a Data Warehousing Context*" XP-002309372, pp. 1-32, Dec. 1, 1997.

Fernandez, et al., U.S. Appl. No. 10/888,365, filed Jul. 9, 2004, entitled *System and Method for Managing User Data in a Plurality of Databases*.

Fernandez, et al., U.S. Appl. No. 10/888,366, filed Jul. 9, 2004, entitled *XML Configuration Technique and Graphical User Interface (GUI) for Managing User Data in a Plurality of Databases*.

Office Action dated Sep. 24, 2008 issued to Fernandez et al., U.S. Appl. No. 10/888,365, filed Jul. 9, 2004, *System and Method for Managing User Data in a Plurality of Databases*, Sep. 24, 2008.

Communication pursuant to Article 94(3) EPC; Application No. 04 777 931.9-1225; Ref. HCD/J00048491EP, Aug. 2, 2010.

Office Action issued by the USPTO for U.S. Appl. No. 10/888,366; Filing Date Jul. 9, 2004; Inventor: Fernandez, Jan. 4, 2010.

Office Action issued by the USPTO for U.S. Appl. No. 10/888,365; Filing Date Jul. 9, 2004; Inventor: Fernandez, Feb. 19, 2010.

Advisory Action issued by the USPTO for U.S. Appl. No. 10/888,366; Filing Date Jul. 9, 2004; Inventor: Fernandez, Mar. 12, 2010.

* cited by examiner

BUSINESS TRANSFORMATION LOGIC ENGINE AND HANDLERS

CROSS REFERENCE TO RELATED APPLICATIONS

This application claims priority to a provisional application entitled "BUSINESS TRANSFORMATION LOGIC ENGINE AND HANDLERS" filed in the United States Patent and Trademark Office on Jul. 11, 2003 and assigned Ser. No. 60/486,512 filed Jul. 11, 2003, the entire contents of which are hereby incorporated by reference. This application is also related to U.S. provisional application Ser. Nos. 60/486,517 and 60/486,508, each filed on Jul. 11, 2003, the entire contents of each of these applications also being incorporated by reference.

BACKGROUND

1. Field

The present invention relates generally to database management systems, and more particularly, to a system and method for managing user data in a plurality of databases. A business transformation logic (BTL) engine transforms data from a source application, through a series of transformation handlers, into a format usable by a target application.

2. Description of the Related Art

Driven by new Internet technologies, business growth requires organizations to extend their systems, applications and directories to partners, suppliers, customers and employees. This explosion in user population makes the task of managing user accounts increasingly complex. It also creates a new need for identity management—the ability to control and monitor individual user access over time.

Compounding this situation are the business realities of mergers, acquisitions and divestitures—the numbers of users are increasing and the numbers of system types are expanding. IT directors are forced to manage multiple operating systems, mail systems, network operating systems and homegrown applications distributed across various, often worldwide locations.

Individually managing multiple directories is time-consuming, costly and error-prone—especially in organizations where changes frequently occur. Keeping up with the daily maintenance can be a significant task. Ensuring overall security and integrity across the board increases the challenge.

To meet these challenges, administrative security systems have been developed to provide user account management across multiple, geographically dispersed security systems and directories. An example of one such system is eTrust™ Admin commercially available from Computer Associates International, Inc. of New York, the assignee of the present application. These systems enable the creation, modification and removal of users across multiple, heterogeneous environments. The single administrative security system allows administrators to centrally define and manage security policies across an enterprise by automating the provisioning of user accounts on a variety of IT systems and ERP (Enterprise Resource Planning) applications, for example, using a role-based approach. That is, role-based user provisioning enables the administrators to automatically provide users with a set of userids based on their business functions and ensures consistent user access policies are applied across a wide range of system types and directories.

With the advances in centralizing the administration of user accounts, there remains a need for techniques for extracting data from directories and ERP applications to populate the administrative security systems without manually reentering the existing data.

SUMMARY

A system and method for managing user data in a plurality of databases is provided. The system and method extracts user data from a source application, repository or database, transforms the user data into global user data, and sends the global user data to a target application capable of managing the global user data across various environments.

According to an aspect of the present invention, a business transformation logic engine for integrating data from a source application to a target application is provided comprising a receiving module for receiving data from the source application in a first predetermined format; and at least one transformation handler for transforming the received data into a second predetermined format usable by the target application. Furthermore, the business transformation logic engine may comprise a template handler for developing application-specific handlers; a XSL (Extensible Stylesheet Language) files handler for transforming the received data with a chain of XSL files; a business rules handler for defining and executing a series of business rules; a mapping handler for associating data from the source application to data in the target application; or a generic component handler for transforming the source data into a workflow request for integrating the source data to the target application.

According to another aspect of the present invention, a method for integrating data from a source application to a target application is provided. The method comprises the steps of receiving, decoding and uncompressing an XML message including the source data; creating a message context object from the uncompressed XML message; transforming the message context object into a workflow request for integrating the source data to the target application.

In a further aspect of the present invention, a program storage device readable by a machine, tangibly embodying a program of instructions executable by the machine to perform method steps for integrating data from a source application to a target application is provided, the method steps comprising receiving, decoding and uncompressing an XML message including the source data; creating a message context object from the uncompressed XML message; transforming the message context object using user-configured XSL entries; applying business rules to the message context object; mapping source data elements to target data elements; and transforming the XSL-transformed data into a workflow request for integrating the source data to the target application.

BRIEF DESCRIPTION OF THE DRAWINGS

The above and other aspects, features, and advantages of the present invention will become more apparent in light of the following detailed description when taken in conjunction with the accompanying drawings in which.

DETAILED DESCRIPTION

Preferred embodiments of the present invention will be described hereinbelow with reference to the accompanying drawings. In the following description, well-known functions or constructions are not described in detail to avoid obscuring the invention in unnecessary detail.

A system and method for managing user data in a plurality of databases is provided. The system and method extracts user data from a source application, repository or database, transforms the user data into global user data, and sends the global user data to a target application capable of managing the global user data across various environments.

Figure 1:
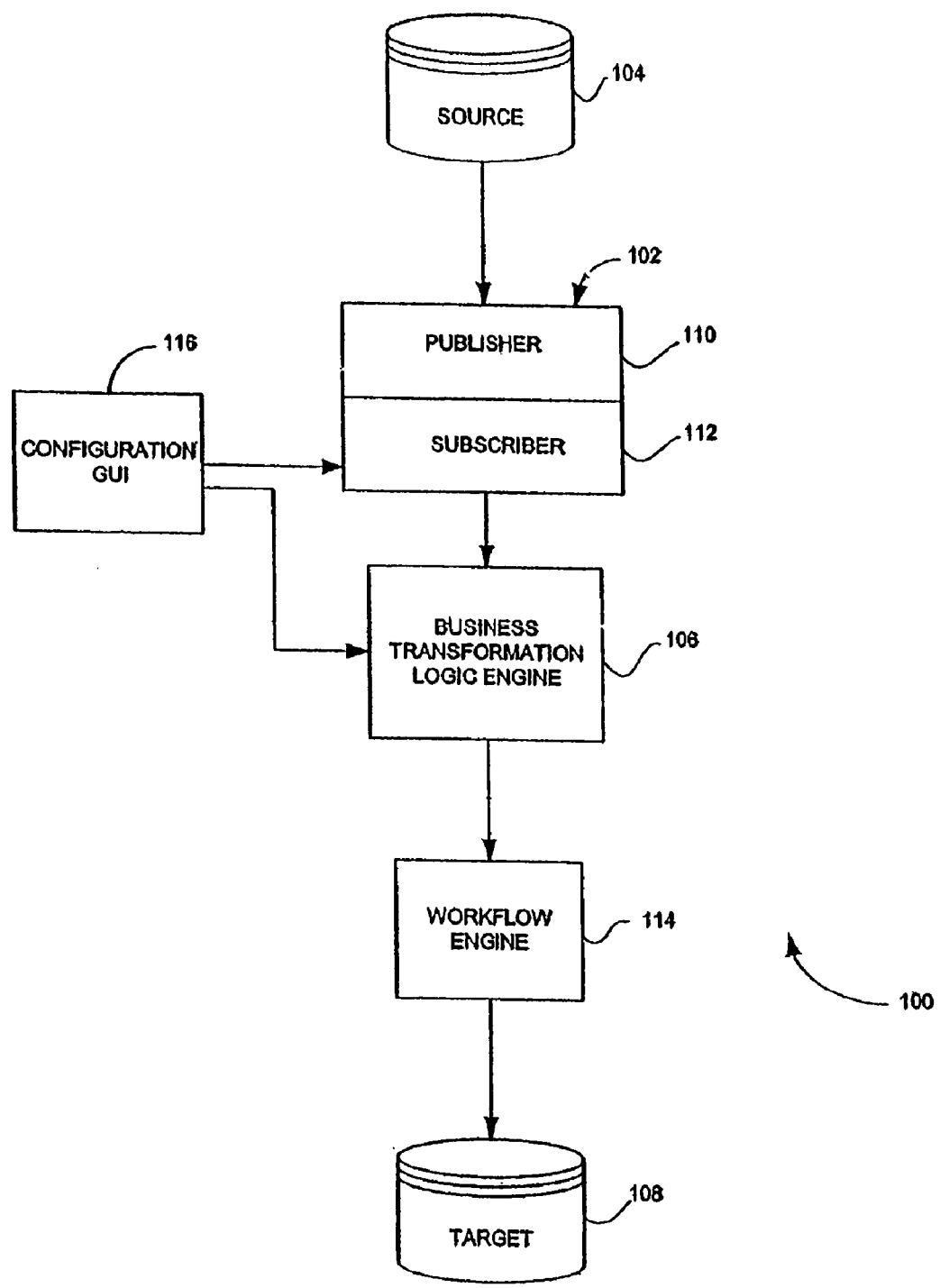
FIG. 1 is a block diagram of an exemplary system for managing user data in a plurality of databases in accordance with an embodiment of the present invention.

FIG. 1 is a block diagram of a system for managing user data in a plurality of databases. Generally, the system 100 includes an interface module 102 for extracting user data from a source application 104 and a business transformation logic (BTL) engine 106 for transforming the user data into a format usable by a target application 108. The interface module 102 includes a publisher 110 for extracting user data, e.g., employee data, from the source application 104. The publisher 110 publishes an XML message from the extracted user data and sends it to a subscriber 112. The subscriber 112 receives, decodes, and uncompresses the XML message. The subscriber 112 then sends the data to the BTL engine 106 that creates a MessageContext object with XML messages and sends it through a chain of BTL handlers, which will be described in detail below. From the BTL handlers, the object is sent to a workflow engine 114 where a request is created and sent to the target application 108. Depending on the request, the target application 108 creates, modifies, or deletes global users, their accounts, or changes the roles associated with a global user. Additionally, a configuration GUI (graphical user interface) 116 is provided for a user, e.g., an administrator, to define the information to be transformed from the source application 104 to the target application 108.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), a read only memory (ROM) and input/output (I/O) interface(s) such as a keyboard, cursor control device (e.g., a mouse or joystick) and display device. The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

Additionally, it is to be appreciated that the system and method may be implemented on several machines coupled together over a network, e.g., a local area network (LAN), a Wide Area Network (WAN), the Internet, etc. For example, the interface module may be implemented on a first machine while the business transformation logic engine may be implemented on a second machine.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figure 2:
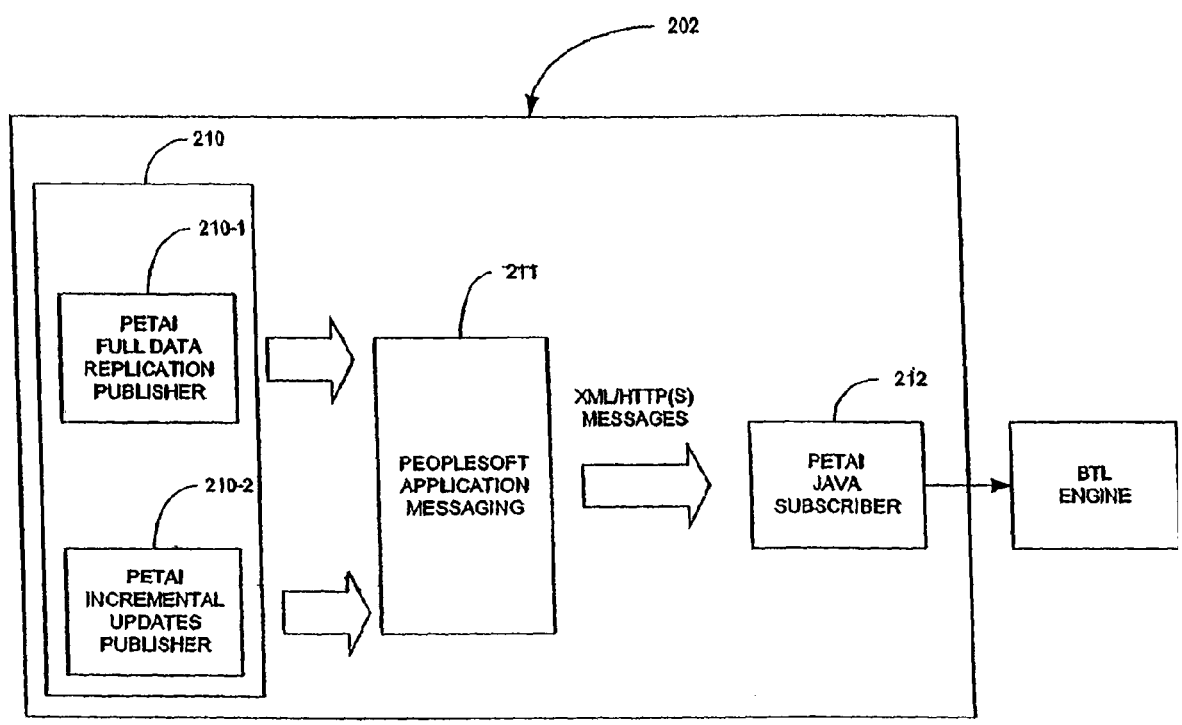
FIG. 2 is a block diagram of an interface module in accordance with an embodiment of the present invention.
Figure 3:
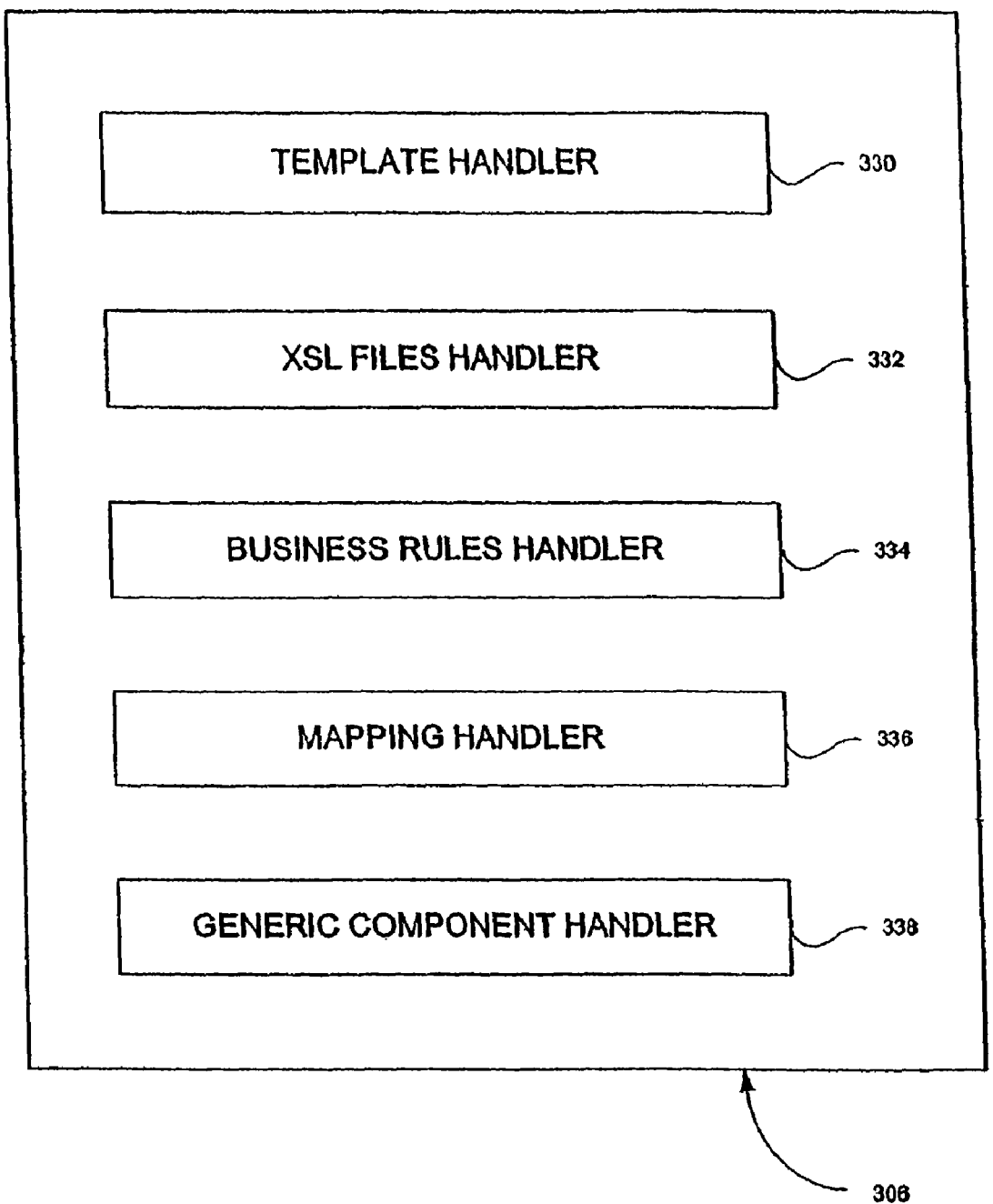
FIG. 3 is a block diagram of a business transformation logic (BTL) engine in accordance with an embodiment of the present invention.

An embodiment of the present invention will be described below using a PeopleSoft™ application as the source application and Computer Associates' eTrust™ Admin as the target application with reference to FIGS. 2 and 3, where FIG. 2 is a graphical representation of a PeopleSoft™ eTrust™ Admin Interface (PETAI) module 202 and FIG. 3 is a block diagram of the BTL engine 306. It is to be appreciated that although the embodiment described below references PeopleSoft's HRMs (Human Resources Management System), the principles of the present invention will apply to other source applications and is not limited to that described below.

The main purpose of PETAI module 202 is to interface with PeopleSoft™ and to feed the PeopleSoft™ data onto the BTL Engine 306. The feed process will take place using two different mechanisms: Full Data Replication and Incremental Updates. The Full Data Replication process will be used to seed, or initially populate or repopulate, a copy of the entire sub-set of PeopleSoft™ records and fields exported onto eTrust™ Admin. The Incremental Updates mechanism will keep eTrust™ Admin current, with changes made on the master PeopleSoft™ data. Incremental updates will contain only the records where the data has been modified.

The PETAI module 202 will be implemented using PeopleSoft™ Enterprise Integration technology, specifically using Application Messaging 211 and will be loaded into the PeopleSoft™ application. PeopleSoft™ Application Messaging is based on a "publish-and-subscribe" model that enables a third party external system to integrate with PeopleSoft™ applications via XML/HTTP(S) messages.

The PETAI module 202 includes a publisher 210 and a subscriber 212. The publisher mechanism 210 will be deployed onto PeopleSoft™ and will publish and deliver the XML messages to eTrust™ Admin subscriber 212. The PETAI module 202 will comprise two separate publisher mechanisms, one for implementing the Full Data Replication 210-1 one for the Incremental Updates 210-2. The eTrust™ Admin subscriber mechanism 212 will be deployed onto the PeopleSoft™ Application Messaging Gateway 211 and will capture, transform and pass the XML messages onto the BTL engine 306.

The Incremental Updates Publisher mechanism 210-2 will subscribe to internal application messages that synchronize Peoplesoft™ database components when changes are being made to the PeopleSoft™ records and fields. Then, it will build the PeopleSoft™ XML message(s) and populate it (them) with the data, and finally publish it (them) onto the eTrust™ Admin subscriber 212. The Full Data Replication Publisher mechanism 210-1 will query all the defined PeopleSoft™ records and fields to get a full copy of data, then it will build the PeopleSoft™ XML message(s) and populate it (them) with the data, and finally publish it (them) onto the eTrust™ Admin subscriber 212.

Many PeopleSoft™ application tables are effective-dated, meaning that historical and future-date rows may be present on the table. eTrust™ Admin does not use effective dating so the PETAI module 202 will need to filter and provide only the current or active information before feeding it onto eTrust™ Admin. This filtering process will take place in the publisher 210 and needs to be implemented for both full data replication and incremental updates publisher mechanisms.

The PETAI module 202 will define a sub-set of PeopleSoft™ records and fields that will be published and delivered to the eTrust™ Admin subscriber 212. This definition will be taken from the PeopleSoft™ Message definitions(s) that will carry on the data to eTrust™ Admin. Separate PeopleSoft™ message definitions will be created for the full data replication and incremental updates publishers.

The subscriber 212, e.g., a Java subscriber, will be deployed and registered into the PeopleSoft™ Application Messaging Gateway Servlet. It will be in charged of capturing, decoding and uncompressing any XML messages delivered to eTrust™ Admin, and passing them onto the BTL engine 306. Transformations will change the format used in the XML message from a PeopleSoft™ format to an eTrust™ Admin format. The Java subscriber 212 will also integrate with the PeopleSoft™ Application Messaging Config Servlet. The Config servlet will allow the administrator to load/unload the PETAI Java subscriber 212 as well as configuring PeopleSoft™ Nodes to be subscribed from. Integration code will interface with the Config servlet APIs including a HTML graphical user interface for the Java subscriber configuration.

To handle large XML messages, a separated thread will process the full data replication messages while the Java subscriber thread will process incremental updates messages. This separate thread is implemented by an EDI (Electronic Data Interchange) engine. Once the subscriber 212 transforms the user data from the source application, the data is passed to the BTL engine 306. The purpose of the BTL engine 306 is to provide a means to transform the input PeopleSoft™ data coming from the PETAI module 202 into Workflow request(s). This request(s) will lead towards the provisioning, modification or de-provisioning of an eTrust™ Admin Global user and all associated accounts. The transformation will be performed by a series of BTL handlers that will be invoked by the BTL engine 306, as shown in FIG. 3. The invocation process will follow a pre-determined order previously specified in the configuration GUI. Each BTL handler will receive, apply its transformation and pass onto the next handler a MessageContext Object. The MessageContext object is a structure, which will contain the PeopleSoft™ data in an XML format among other parts.

The BTL engine 306 will enable the administrator to determine and assign Roles to Global Users based on PeopleSoft™ data; to calculate and assign custom data fields to Global User attributes, for example, to generate a user id using two or more PeopleSoft™ data fields and some specific business rules; to map data elements within the XML buffer to Global User Attributes; to access custom code and/or third party code to set Global User attributes; etc.

The BTL engine 306 will comprise a chain of handlers including a sample template handler 330, XSL files handler 332, business rules handler 334, mapping handler 336, and generic component handler (Dirsync Handler) 338.

The template handler 330 will serve as a starting point for the end user to develop custom BTL handlers for transforming data.

The XSL handler 332 will allow the end user to transform the input XML message based on a chain of XSL (Extensible Stylesheet Language) files. The stylesheet must be provided a separated file containing the XSL Transformation code (no need to re-compile Java code). To get a hold of the XSL file, this handler will use a parameter in a configuration file containing an ID for the stylesheet, the name of the XSL file and an order number to be applied. For example, a PSCAMA (PeopleSoft™ Common Application Message Attributes) handler may have an entry as follows:

```
<xsl-entry>
    <stylesheet-id>pscama</stylesheet-id>
    <stylesheet-filename>pscama.xsl</stylesheet-filename>
    <stylesheet-order>1</stylesheet-order>
</xsl-entry>
<xsl-entry>
    <stylesheet-id>sample</stylesheet-id>
    <stylesheet-filename>sample.xsl</stylesheet-filename>
    <stylesheet-order>2</stylesheet-order>
</xsl-entry>
```

The PSCAMA XSL program will provide the functionality to filter PSCAMA and data records in the XML message. The filtering code will use an audit action field (AUDIT_ACTN) at the PSCAMA record to filter the data records in the XML message. Logic will be as follows:

The data record will be included in the output if
  PSCAMA record not present for a specific data record
  PSCAMA record is present and AUDIT_ACTN is set to 'A' or 'C' or 'N' or A sample XSL program will also be provided. It will serve as a starting point for the end user, e.g. administrator, to develop custom XSL programs.

The business rules (BR) handler 334 enables the user to create a set of decision tables that match their specific needs. A decision table is a set of business rules that determine the assignments of special Global User attributes required in the user provisioning process. Special Global User attributes can be roles, profiles, groups, or any other attribute requiring special treatment to determine its value. Decision tables present a sophisticated mechanism to set special attributes without having to write any code.

For each special Global User attribute an administrator may want to assign, the administrator will create one decision table. Each decision table needs to specify a set of input parameters to be used in the calculation of the attribute value. A decision table header enables the administrator to provide this information. The header's first column is where the output field name is to be placed. Valid output field names are considered any field name on the ETRUST_ADMIN record. The rest of the header columns are where the input parameters are to be placed. Valid input parameters are considered any field on the XML message and must be defined using XPath standard syntax.

The decision table rows are where the business rules are defined. Each row specifies the output value, the combination of comparison values, and operators for assigning the value. The first column on each row is where the output value is placed. The rest of the row columns are where the comparison values and the operators are placed. Valid comparison values are any real value in the PeopleSoft™ database and valid comparison operators are '=' (equal) and '!=' (not equal).

The following decision table example assigns the Global User Role attribute (Role-Name) and uses three input parameters to calculate the value (Country, Department ID, and Company). The sample defines two business rules for assigning two different role values.

| Role-Name | PERSON/ PERSONAL_ DATA/ COUNTRY | PERSON/ JOB/ DEPTID | PERSON/ JOB/ COMPANY |
|---|---|---|---|
| Namerica_HR_GBI_Role | =USA | =HR | =GBI |
| International_Role | !=USA | | |

The following is the above decision table in XML format:

```
<decision-table-entry>
  <decision-table-id>roles</decision-table-id>
  <header>
    <header-output>
      <header-field-name>Role-Name</header-field-name>
    </header-output>
    <header-input-entry>
      <header-position>0</header-position>
      <header-xpath>PERSON/PERSONAL_DATA/
      COUNTRY</header-xpath>
    </header-input-entry>
    <header-input-entry>
      <header-position>1</header-position>
      <header-xpath>PERSON/JOB/DEPTID</header-xpath>
    </header-input-entry>
    <header-input-entry>
      <header-position>2</header-position>
      <header-xpath>PERSON/JOB/COMPANY</header-xpath>
    </header-input-entry>
  </header>
  <rows>
    <row-entry index="0" >
      <row-output>
        <row-field-value>NAmerica_HR_GBI_role</row-field-value>
      </row-output>
      <row-input-entry>
        <row-position>0</row-position>
        <row-comparison-value>USA</row-comparison-value>
        <row-comparison-operator>=</row-comparison-operator>
      </row-input-entry>
      <row-input-entry>
        <row-position>1</row-position>
        <row-comparison-value>10000</row-comparison-value>
        <row-comparison-operator>=</row-comparison-operator>
      </row-input-entry>
      <row-input-entry>
        <row-position>2</row-position>
        <row-comparison-value>GBI</row-comparison-value>
        <row-comparison-operator>=</row-comparison-operator>
      </row-input-entry>
    </row-entry>
    <row-entry index="1" >
      <row-output>
        <row-field-value>International_role</row-field-value>
      </row-output>
      <row-input-entry>
        <row-position>0</row-position>
        <row-comparison-value>USA</row-comparison-value>
        <row-comparison-operator>!=</row-comparison-operator>
      </row-input-entry>
    </row-entry>
  </rows>
</decision-table-entry>
<decision-table-entry>
  <decision-table-id>groups</decision-table-id>
  <header>
    <header-output>
      <header-field-name>Group-Name</header-field-name>
    </header-output>
    <header-input-entry>
      <header-position>0</header-position>
      <header-xpath>PERSON/PERSONAL_DATA/
      COUNTRY</header-xpath>
    </header-input-entry>
  </header>
  <rows>
    <row-entry index="0" >
      <row-output>
        <row-field-value>NAmerica_group</row-field-value>
      </row-output>
      <row-input-entry>
        <row-position>0</row-position>
        <row-comparison-value>USA</row-comparison-value>
        <row-comparison-operator>=</row-comparison-operator>
      </row-input-entry>
    </row-entry>
    <row-entry index="1" >
      <row-output>
        <row-field-value>International_group</row-field-value>
      </row-output>
      <row-input-entry>
        <row-position>0</row-position>
        <row-comparison-value>USA</row-comparison-value>
        <row-comparison-operator>!=</row-comparison-operator>
      </row-input-entry>
    </row-entry>
  </rows>
</decision-table-entry>
```

The business rules handler 334 then sends the message to the mapping handler 336.

The BTL mapping handler 336 associates one PeopleSoft™ data field or a custom record field to a Global User attribute of the eTrust™ Admin application. The mapping supports the association of any element and any non-element within the XML message to a Global User Attribute using XPath standard syntax.

The mapping of attributes will be defined by XML data stored in the configuration file. The end user can customize the XML data to fit their specific needs using the configuration GUI. The configuration file will use XPath standard syntax to define the mappings having the root element as the context for all definitions.

The following XML data represents a sample PeopleSoft™ XML message:

```
<MsgData>
  <Transaction>
    <PERSONAL_DATA class="R">
      <EMPLID>C10001</EMPLID>
      <NAME>Stankowski,Richard</NAME>
      <LAST_NAME>Stankowski</LAST_NAME>
      <FIRST_NAME>Richard</FIRST_NAME>
      <MIDDLE_NAME></MIDDLE_NAME>
      <COUNTRY>USA</COUNTRY>
      <ADDRESS1>11308 Wildflower Lane</ADDRESS1>
      <ADDRESS2></ADDRESS2>
      <ADDRESS3></ADDRESS3>
      <ADDRESS4></ADDRESS4>
      <CITY>Grass Valley</CITY>
      <COUNTY></COUNTY>
      <STATE>CA</STATE>
      <POSTAL>97077</POSTAL>
    </PERSONAL_DATA>
    <JOB_ETA_VW class="R">
      <EMPLID>C10001</EMPLID>
      <DEPTID>13000</DEPTID>
      <DESCR>Finance</DESCR>
      <JOBCODE>KU067</JOBCODE>
      <JOBCODE_DESCR>Sr Accounts Payable Clerk</JOBCODE_DESCR>
      <LOCATION>KUDE00</LOCATION>
      <LOCATION_DESCR>Delaware
```

```
            Operations</LOCATION_DESCR>
            <EMPL_STATUS>T</EMPL_STATUS>
            <COMPANY>GBI</COMPANY>
            <BUSINESS_UNIT>GBIBU</BUSINESS_UNIT>
            <BUSINESS_TITLE></BUSINESS_TITLE>
            <SUPERVISOR_ID></SUPERVISOR_ID>
         </JOB_ETA_VW>
      </Transaction>
   </MsgData>
```

For example, mapping definitions for "EMPLID" and "DEPTID" elements will be represented using XPath standard syntax as:

```
<eta21-attribute-mapping>
    <custom-element-xpath>PERSONAL_DATA/
    EMPLID</custom-element-xpath>
    <attribute-name>eTUserid</attribute-name>
    <attribute-mod-flag>overwrite</attribute-mod-flag>
</eta21-attribute-mapping>
<eta21-attribute-mapping>
    <custom-element-xpath>PERSONAL_DATA/
    EMPLID</custom-element-xpath>
    <attribute-name>eTGlobalUserName</attribute-name>
    <attribute-mod-flag>overwrite</attribute-mod-flag>
</eta21-attribute-mapping>
<eta21-attribute-mapping>
    <custom-element-xpath>JOB_ETA_VW/
    DEPTID</custom-element-xpath>
    <attribute-name>eTDepartment</attribute-name>
    <attribute-mod-flag>overwrite</attribute-mod-flag>
</eta21-attribute-mapping>
```

The generic component handler 338 will be the end point in the BTL engine chain and ultimately will transform the PeopleSoft™ data into Workflow requests. The generic component handler 338 takes the input data from the mapping handler 336 and transform it onto Workflow requests. A Workflow request is a record within the Workflow repository or engine 114 representing a group of action tasks that will take place as a result of the execution of the request. Sample action tasks are: Create Global User, Modify Global User, Delete Global User, Add Role to Global user, etc.

Among other functions, the configuration GUI 116 will be employed to configure the various BTL handlers. The purpose of the configuration GUI 116 is to provide a means for a system administrator to easily define the information that is needed to transform a PeopleSoft™ User Entry into an eTrust™ Admin Global User Entry. This information will include the resulting eTrust™ Admin Global User attributes and the means that is used to produce them.

The BTL configuration GUI 116 will be comprised of the following interfaces:

BTL Handlers Registration: This interface will allow the end user to register BTL handlers on the BTL engine and define their invocation order.

Attribute Mapping Interface: This interface will allow the end user to define the mapping parameters used by the BTL Mapping Handler.

Decision Tables Interface: This interface will allow the end user to create and add decision tables to be executed by the BTL Business Rules Handler.

General Configuration: This interface will allow the end user to set all remaining configuration parameters.

The configuration GUI 116 will additionally enable the administrator to set any necessary configuration parameters. These configuration parameters will be held in the XML configuration file mentioned above. Below is an exemplary list of parameters included in the configuration file:

| Parameter Name | Parameter Description |
| --- | --- |
| erpfeed-config | This is the root element for the XML configuration file (replaces 'dirsync-config'). |
| supported-message-name | This element holds a Peoplesoft Message name that will be processed by the BTL Engine. By default, there will be an entry with the following names: ETA_PERSON_SYNC_EFF ETA_PERSON_FULLSYNC_EFF |
| etahandler-nodename | This element holds a PeopleSoft external node name that we want to subscribe. By default, there will be an entry with the following names: ETRUST |
| etahandler-html-root-dir | This element holds the folder name where this option is installed. Set by default to: /eaopeo21 |
| output-user-tag-name | This element holds the output user tag name that the Mapping Handler will use to represent a Global User Entry at the output message. Set by default to: UserEntry |
| peoplesoft-msgdata-tag-name | This element holds the MsgData tag name of the PeopleSoft input XML message. This tag name contains all transaction elements within a message. Set by default to: MsgData |
| peoplesoft-fieldtypes-tag-name | This element holds the FieldTypes tag name of the PeopleSoft input XML message. This tag name contains the PeopleSoft field type information section of the message. Set by default to: FieldTypes |
| peoplesoft-trans-tag-name | This element holds a Transaction tag name of the PeopleSoft input XML message. This tag name contains the record data elements for a transaction. Set by default to: Transaction |
| full-data-replication-threshold | This element holds the threshold of transactions to determine if a PeopleSoft input XML message will be processed as an incremental updates message or as a full data replication message. Set by default to: 1 |

-continued

| Parameter Name | Parameter Description |
|---|---|
| full-data-replication-output-dir | This element holds the folder name where full data replication messages will be copied. Set by default to: fulldatareplication_output/ |
| log-level-num | This element holds the log level. Valid values are from 1 to 5. Set by default to: 3 |
| xsl-entries-dir | This element holds the folder name where XSL files must be placed. The XSLT handler or extended classes will expect stylesheets to be located at this folder. Set by default to: XSL/ |
| xsl-entry | This is the main element for a XSL entry. This contains the 'stylesheet-id' and 'stylesheet-filename' elements. |
| stylesheet-id | A unique ID identifying an 'xsl-entry'. |
| stylesheet-filename | The XSL file name containing the transformation code to be used by an 'xsl-entry'. |
| Stylesheet-order | This element holds the order number of a XSL entry. |
| eta21-attribute-mapping | This is the main mapping element containing each map entry (Replaces 'eta-attribute-mapping'). This contains the 'custom-element-xpath', 'attribute-name' and 'attribute-mod-flag' elements. |
| custom-element-xpath | This element holds the custom XPath sentence addressing the part of the input XML message to be mapped to the Global User attribute. Note: the same custom element can be mapped to one or more attribute names but the same attribute name can not be set by two or more custom elements. |
| btl-handler-entry | This is the main element for a BTL Handler entry. This contains the 'btl-handler-classname' and 'btl-handler-order' elements. |
| btl-handler-classname | This element holds the full Java class name of a BTL handler entry. |
| btl-handler-order | This element holds the order number of a BTL handler entry. |
| start-edi-engine | This element holds a Boolean value that allows to load or not the EDIEngine for processing full data replication messages. By default set to: true |

Additionally, below is an exemplary list of decision table parameters used in configuring the business rules handlers:

| Parameter Name | Multi-value | Value Type | Attributes | Description |
|---|---|---|---|---|
| decision-table-entry | Yes | — | — | Groups a decision table. |
| decision-table-id | No | Text | — | The decision table id. |
| header | No | — | — | Groups the decision table header. |
| header-output | No | — | — | Groups a header output. |
| header-field-name | No | Text | — | The output field name for this decision table. |
| header-input-entry | Yes | — | — | Groups a header input entry. |
| header-position | No | Numeric | — | Header input entry position. |
| header-xpath | No | XPath | — | Header input field (must use standard XPath). |
| rows | No | — | — | Groups all decision table rows. |
| row-entry | Yes | — | index | Groups a row entry. |
| row-output | No | — | — | Groups the row output. |
| row-field-value | No | Text | — | Output field value for a row. |
| row-input-entry | Yes | — | — | Groups a row input entry. |
| row-position | No | Numeric | — | The row position. |
| row-comparison-value | No | Text | — | The row comparison value (must be the same type as header entry for this position). |

-continued

| Parameter Name | Multi-value | Value Type | Attributes | Description |
|---|---|---|---|---|
| row-comparison-operator | No | Text | — | The row comparison operator. Valid values are:<br>=<br>!= |

It is worth noting that to define the mappings and the BR decision tables meta-data will be required. This meta-data will be needed for both eTrust™ Admin and PeopleSoft™. In the case of PeopleSoft™, it will consist of the attributes that can be used as parameters to the Decision Table Definitions. In the case of eTrust™ Admin, this data will consist of a list of all supported Global User attributes. There will be two ways that the PeopleSoft™ data can be obtained from the BTL Configuration GUI. The first is by using a PeopleSoft™ Extract. From an existing extract, the BTL configuration GUI will be able to obtain the required meta-data. At any time, the system administrator will be able to add to and modify this meta-data. In the case of eTrust™ Admin meta-data, a listing of the attributes that exist will be readily available from the configuration GUI. In the BTL Configuration GUI, the eTrust™ Admin meta-data may be modified as well.

Figure 4:
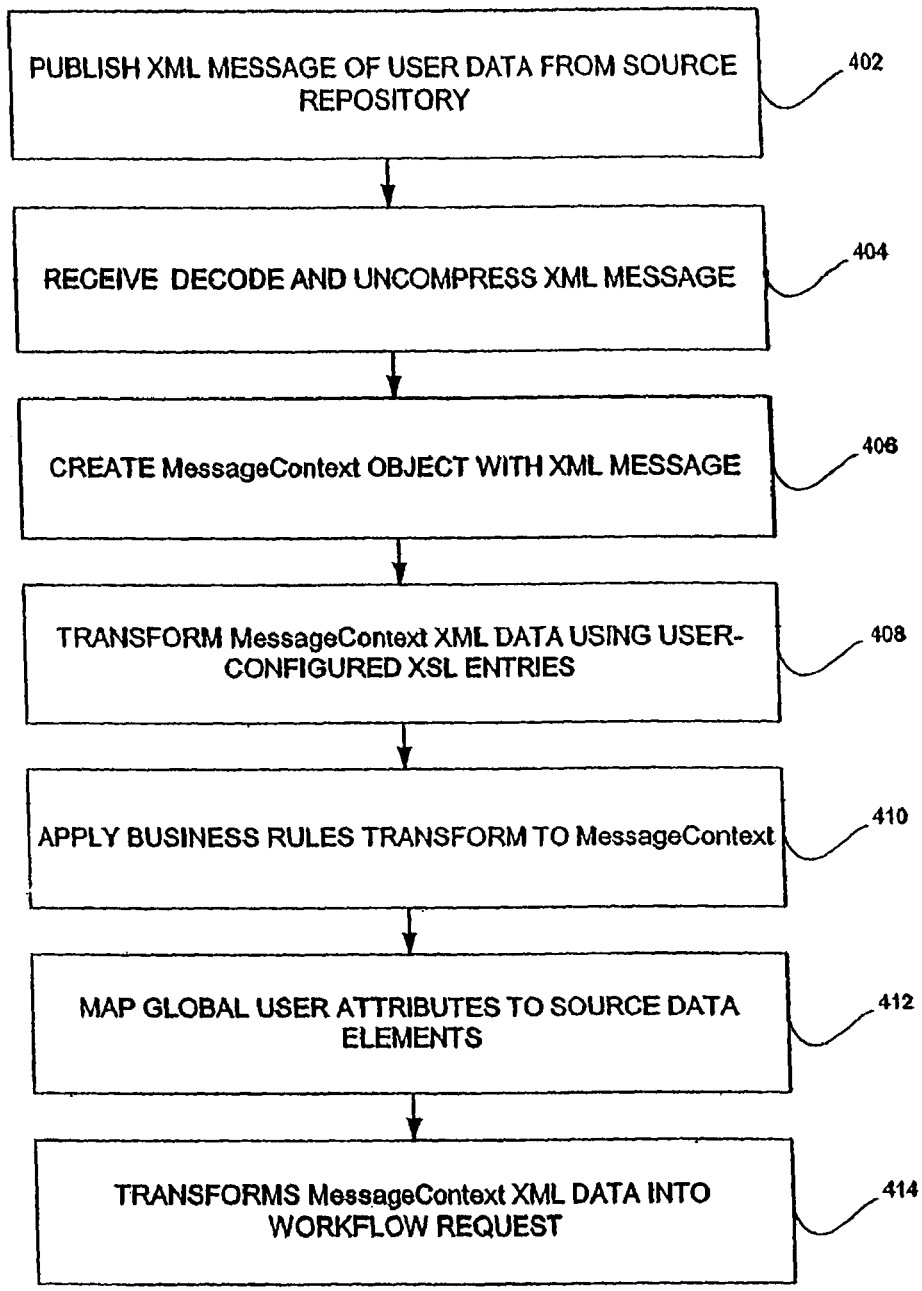
FIG. 4 is a flow diagram illustrating a method for managing user data in a plurality of databases in accordance with an embodiment of the present invention.
Figure 5:
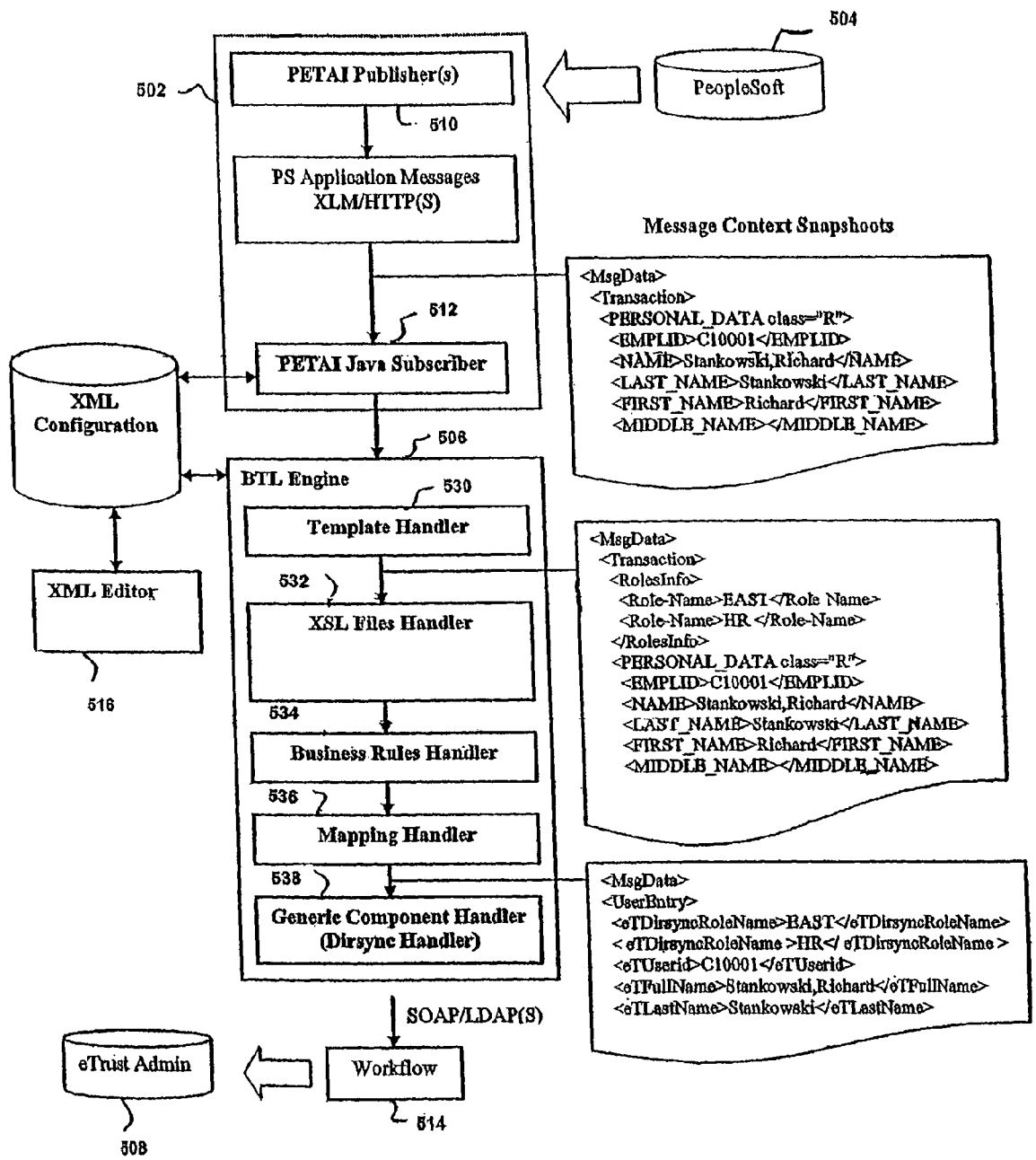
FIG. 5 is an overall flow diagram illustrating a system and method for managing user data in a plurality of databases, where a source application or repository is a PeopleSoft™ application and a target application or repository is eTrust™ Admin.

With reference to FIGS. 4 and 5, a method for managing user data in a plurality of databases will be described illustrating the data flow where the source application is a PeopleSoft™ application and the target application is eTrust™ Admin.

The PETAI module 502 will interface with PeopleSoft™ system 504 (step 402) and will feed PeopleSoft™ data onto the BTL engine 506 through its Java Subscriber 512 (step 404). The BTL engine 506 will generate a MessageContext object containing the PeopleSoft™ data and it will pass it on to the first BTL handler defined in the configuration file that in this case is the sample template handler 530 (step 406). The template handler 530 will process and transform the MessageContext object and it will pass it on to next handler in the chain. The XSL files handler 532 receives the MessageContext and applies a chain of XSL Transformations, e.g., PSCA-MA.XSL and sample.XSL (step 408).

The business rules handler 534 receives the MessageContext object and transforms it executing any decision tables defined in the configuration file (step 410), via the configuration GUI 516. Then, it will pass it on to the mapping handler 536. The mapping handler 536 receives the MessageContext object and transforms it assigning PeopleSoft™ data fields and custom fields to Global User attributes based on the mapping information in the configuration file (step 412). Then, it will pass it on to the generic component handler 538. The generic component handler or end point handler (Dirsync Handler) will ultimately generate eTrust™ Admin Workflow requests (step 414), via the workflow engine 514. This request(s) will lead towards the provisioning, modification or de-provisioning of Global user and all associated accounts in the eTrust™ Admin application 508.

The system and method according to embodiments of the present invention provides organizations the ability to capture changes to a source application, e.g., a PeopleSoft™ application, in real time. The system and method transforms the data into "intelligible" user provisioning requests based on business rules associated with specific values in the source application data. The system and method then submits these requests via a workflow engine to a user provisioning engine, e.g., a target application, which ultimately sends (create, delete, or modify) requests to managed security systems. In summary, embodiments of the present invention automate the user provisioning process from a source application to the heterogeneous security systems making up the organizations IT infrastructure.

While the invention has been shown and described with reference to certain preferred embodiments thereof, it will be understood by those skilled in the art that various changes in form and detail may be made therein without departing from the spirit and scope of the invention as defined by the appended claims.

What is claimed is:

1. A method for integrating data from a source application to a target application, the method comprising the steps of:
   receiving an XML message including the source data;
   creating a message context object from the XML message by transforming the XML message based on mapping information in a configuration file, the message context object comprising a particular structure comprising the source data in a particular XML format;
   transforming the message context object using user-configured XSL entries;
   applying business rules to the transformed message context object;
   mapping source data elements of the transformed message context object to target data elements;
   transforming the XSL-transformed data into a workflow request, the workflow request comprising a plurality of executable action tasks that execute as a result of execution of the workflow request, the plurality of action tasks being based on the source data in the particular XML format for integrating the source data to the target application; and
   transmitting the workflow request to the target application.

2. The method as in claim 1, wherein at least one of the business rule determines an assignment of at least one user attribute from the received data.

3. The method as in claim 2, wherein the at least one user attribute is a user role, user profile or user group.

4. The method as in claim 1, further comprising mapping a data field of the source data to a user attribute of the target application.

5. The method as in claim 1, wherein at least one of the plurality of executable action tasks is selected from the group consisting of create a user, modify a user, delete a user, and add role to user.

6. A program storage device readable by a machine, tangibly embodying a program of instructions executable by the machine to perform method steps for integrating data from a source application to a target application, the method steps comprising:
   receiving an XML message including the source data;
   creating a message context object from the XML message by transforming the XML message based on mapping information in a configuration file, the message context object comprising a particular structure comprising the source data in a particular XML format;
   transforming the message context object using user-configured XSL entries;
   applying business rules to the transformed message context object;

mapping source data elements of the transformed message context object to target data elements;

transforming the XSL-transformed data into a workflow request, the workflow request comprising a plurality of executable action tasks that execute as a result of execution of the workflow request, the plurality of action tasks being based on the source data in the particular XML format for integrating the source data to the target application; and transmitting the workflow request to the target application.

* * * * *